(12) United States Patent
Choi et al.

(10) Patent No.: US 8,308,175 B2
(45) Date of Patent: Nov. 13, 2012

(54) TUBULAR TORSION BEAM FOR REAR SUSPENSIONS OF VEHICLES AND MANUFACTURING METHOD THEREOF

(75) Inventors: Han Ho Choi, Gwangyang-si (KR);
Yeon Sik Kang, Gwangyang-si (KR);
Sung Ho Park, Gwangyang-si (KR); Jin Ho Oh, Gwangyang-si (KR); Keun Hwan Kim, Gwangyang-si (KR)

(73) Assignee: Posco (KR)

( * ) Notice: Subject to any disclaimer, the term of this patent is extended or adjusted under 35 U.S.C. 154(b) by 120 days.

(21) Appl. No.: 12/669,863

(22) PCT Filed: Jul. 24, 2008

(86) PCT No.: PCT/KR2008/004346
§ 371 (c)(1),
(2), (4) Date: Mar. 3, 2010

(87) PCT Pub. No.: WO2009/014396
PCT Pub. Date: Jan. 29, 2009

(65) Prior Publication Data
US 2010/0187788 A1    Jul. 29, 2010

(30) Foreign Application Priority Data

Jul. 25, 2007  (KR) .................. 10-2007-0074615
Dec. 24, 2007  (KR) .................. 10-2007-0136227

(51) Int. Cl.
*B60G 9/04*   (2006.01)
*B60G 7/00*   (2006.01)
(52) U.S. Cl. ... 280/124.106; 280/124.137; 280/124.149; 280/124.152; 280/124.166
(58) Field of Classification Search .......... 280/124.106, 280/124.107, 124.128, 124.13, 124.137, 280/124.149, 124.152, 124.16, 124.166, 280/124.116; 301/124.1, 127; 29/897.2
See application file for complete search history.

(56) References Cited

U.S. PATENT DOCUMENTS 4,165,098 A * 8/1979 Wagner .................. 280/124.116
(Continued)

FOREIGN PATENT DOCUMENTS

DE     10102759 A1    7/2002
(Continued)

OTHER PUBLICATIONS

Inoue et al., Hollow Torsion Bar, Feb. 22, 1994, JPO, JP 06-050370 A, Machine Translation of Description.*
(Continued)

*Primary Examiner* — Joseph Rocca
*Assistant Examiner* — James English
(74) *Attorney, Agent, or Firm* — The Webb Law Firm

(57) ABSTRACT

Provided is a tubular torsion beam for rear suspensions of vehicles, which is produced according to a more durable design capable of improving roll stiffness and roll strength of the tubular torsion beam. The tubular torsion beam is produced by pressure-forming a tubular steel member through hydroforming such that the tubular torsion beam has a cross-section varying along an entire length thereof, with opposite ends having a closed cross-section and mounted to respective trailing arms, a middle portion having a V-shaped open cross-section, and a transitional portion having a varying cross-section and connecting the middle portion to each of the opposite ends. During the process of manufacturing the tubular torsion beam, the opposite ends of the tubular steel member are fed using respective axial punches of a hydroforming machine, so that the opposite ends are thicker than the middle portion.

18 Claims, 8 Drawing Sheets

U.S. PATENT DOCUMENTS

| | | | |
|---|---|---|---|
| 5,518,265 A * | 5/1996 | Buthala et al. | 280/124.166 |
| 6,047,978 A * | 4/2000 | Watanabe et al. | 280/124.106 |
| 6,585,331 B2 * | 7/2003 | Varela | 301/125 |
| 7,257,982 B2 * | 8/2007 | Park | 72/398 |
| 7,284,765 B1 * | 10/2007 | Inoue et al. | 280/124.166 |
| 2001/0022099 A1 * | 9/2001 | Ueno et al. | 72/57 |
| 2004/0256828 A1 | 12/2004 | Han et al. | |
| 2005/0035567 A1 * | 2/2005 | Ok et al. | 280/124.107 |
| 2007/0246904 A1 * | 10/2007 | Murata et al. | 280/124.128 |
| 2010/0072724 A1 * | 3/2010 | Toepker | 280/124.106 |

FOREIGN PATENT DOCUMENTS

| | | |
|---|---|---|
| EP | 0647537 A1 | 4/1995 |
| EP | 0760265 A1 | 3/1997 |
| JP | 6050370 A | 2/1994 |
| JP | 2001321846 A | 11/2001 |
| JP | 2004001052 A | 1/2004 |
| JP | 2004203133 A | 7/2004 |
| JP | 2005306177 A | 11/2005 |
| JP | 2007069674 A * | 3/2007 |
| KR | 1020040110247 A | 12/2004 |
| KR | 1020050101899 A | 10/2005 |
| KR | 1998031346 A | 1/2010 |
| KR | 1020040110247 A | 1/2010 |

OTHER PUBLICATIONS

Ando et al., Torsion Beam Type Suspension and its Manufacture Method, JPO, Mar. 22, 2007, JP 2007-069674 A, English Abstract.*

Ando et al., Torsion Beam Type Suspension and its Manufacture Method, JPO, Mar. 22, 2007, JP 2007-069674 A, Machine translation of Description.*

* cited by examiner (A)

(B)

(C)

(a)

(b)

(1° Rolling)

(4° Rolling)

(a)

(b)

(a)

(b)

TUBULAR TORSION BEAM FOR REAR SUSPENSIONS OF VEHICLES AND MANUFACTURING METHOD THEREOF

TECHNICAL FIELD

The present invention relates, in general, to a tubular torsion beam for rear suspensions of vehicles and a manufacturing method thereof and, more particularly, to the provision of tubular torsion beams having excellent roll stiffness and excellent roll strength, produced through hydroforming.

BACKGROUND ART

Suspensions for vehicles are structural devices used for suspending a vehicle body and absorbing shocks from the road during the operation of a vehicle, thereby preventing the shocks from being applied to the vehicle body and to passengers. Thus, the suspensions must be designed such that they can attenuate shocks from a road and make passengers feel comfortable despite the shocks, and improve steering stability, determined by the ground contact force of tires during running of vehicles. Another important factor to be considered while designing suspensions is that the suspensions must maintain desired stiffness and desired durability despite the repeated application of shocks from roads thereto. Deformations or cracks formed in the suspensions may impose fatal effects on vehicle stability, and thus the durability design of the suspensions plays an important role in the functional design of the suspensions.

Particularly, a torsion beam suspension, typically used as a rear suspension of a small-sized vehicle, must be designed to have high durability because a torsional load is repeatedly applied to a torsion beam of the suspension. In the torsion beam suspension, the cross-sectional shape of the torsion beam plays an important role in the durability performance of the beam. The cross-sectional shapes of torsion beams may be variously designed according to the different characteristics of vehicles. However, in the initial stage of designing a torsion beam, the cross-sectional shape of the torsion beam must be determined in relation both to the roll stiffness and to the roll strength of a vehicle using the torsion beam, and thus it is required to carefully study the roll stiffness and the roll strength.

In other words, the torsion beam of a rear suspension, which couples a left wheel and a right wheel together, is an important element in maintaining the stiffness of the suspension and in determining the dynamic characteristics of the suspension during the operation of a vehicle. Thus, the torsion beam must be designed such that it has appropriate roll stiffness, determined by the weight of the vehicle, so as to resist torsional deformation and bending deformation, which take place when the left wheel and the right wheel execute respective motions in opposite directions. Further, because normal stress and shear stress are concentrated on the torsion beam, it is required to design the torsion beam such that the beam has appropriate roll strength and has fatigue resistance determined in consideration of running-induced fatigue.

Hereinbelow, the construction and problem of a prior art torsion beam suspension will be described with reference to FIG. 1, which shows a suspension equipped with a conventional plate-type torsion beam. The prior art torsion beam suspension, typically used as a rear suspension in a small-sized vehicle, comprises two trailing arms, which are left and right trailing arms 2 coupled together by a plate-type torsion beam 3, and a bush sleeve 1, which is provided at the front end of each of the two trailing arms 2 and pivots on a vehicle body using a rubber bush. Further, both a spring seat 4 for supporting a suspension spring thereon and a damper bracket 5 for supporting a shock absorber are mounted to the inner side of the rear end of each of the two trailing arms 2. Both a wheel carrier 6 and a spindle plate 7 for holding the rear wheels of a vehicle are mounted to the outer side of the rear end of each of the two trailing arms 2. The above-mentioned bush sleeves 1, trailing arms 2, spring seats 4, damper brackets 5, wheel carriers 6 and spindle plates 7 form basic elements constituting the torsion beam suspension.

The conventional plate-type torsion beam 3 is typically produced using a thick iron plate having a thickness of about 4~6 mm through pressing such that the beam 3 has an open cross-section in a shape of ⊃, ⊂, ⋀, <, >, etc. The plate-type torsion beam 3, having the above-mentioned open cross-section, has low stiffness and low strength, resisting torsional deformation or bending deformation, so that, to increase the stiffness and strength of the torsion beam 3, a reinforcement, such as a torsion bar 8, must be mounted to the torsion beam 3. However, due to the reinforcement, the plate-type torsion beam 3 is problematic in that the increased number of elements constitutes the beam 3, complicates the production process of the beam 3, and increases the weight of a final product.

To solve the problem of the plate-type torsion beam 3, a suspension having a tubular torsion beam has been used in recent years. An example of suspensions having conventional tubular torsion beams is illustrated in FIG. 2. As shown in FIG. 2, a bush sleeve 1, a trailing arm 2, a spring seat 4, a damper bracket 5, a wheel carrier 6 and a spindle plate 7 are used as basic elements constituting a conventional tubular torsion beam suspension.

The tubular torsion beam 10 of the suspension is produced through pressure-forming using a tubular steel member having a circular cross-section. During the pressure-forming, the tubular steel member is shaped into a torsion beam having a cross-section varying along the entire length thereof. The tubular torsion beam 10 comprises opposite ends 11, which have a closed cross-section, such as a triangular, rectangular or circular cross-section, and are mounted to respective trailing arms 2 of the suspension, a middle portion 13, in which a first semicircular surface part 13a is deformed so as to be in close contact with a second semicircular surface part 13b such that they form a V-shaped cross-section, which is open to one side, and a transitional portion 12, the size of the cross-section of which continuously varies and executes a natural transition from the middle portion 13 to each of the opposite ends 11. Described in detail, the middle portion 13 has a small-sized closed cross-section at each end of the V-shaped cross-section. However, because most of the first semi-circular surface 13a is in close contact with most of the second semicircular surface 13b, the middle portion 13 is regarded as a part having an open cross-section.

In FIG. 2, each of the opposite ends 11 is illustrated as having a closed rectangular cross-section with rounded corners. However, it should be understood that the cross-section of the opposite ends 11 is not limited to the rounded rectangular cross-section, but may be configured to have some other closed cross-section, such as a triangular, angled rectangular or circular cross-section, according to the type of vehicle. When the tubular torsion beam 10 having the above-mentioned construction is compared to the plate-type torsion beam 3 having only an open cross-section, the tubular torsion beam 10 has higher stiffness and higher strength, resisting torsion and bending. Thus, the tubular torsion beam 10 may be used without additional reinforcement.

As described above, the tubular torsion beam 10 is produced through shaping such that the torsion beam 10 has a cross-section continuously varying along the entire length thereof. To produce such a tubular torsion beam in the prior art, conventional pressing or hydroforming has been used. An example of conventional pressing techniques is disclosed in Korean Patent No. 554310. The pressing technique disclosed in Korean Patent No. 554310 will be described hereinbelow with reference to FIG. 3.

To produce such a tubular torsion beam through conventional pressing, first, a tubular steel member 20 is placed between upper and lower molds 21 and 22, which have specified shaping surfaces configured to shape opposite ends having a closed cross-section, a transitional portion having a varying cross-section, and a middle portion having a V-shaped open cross-section. After placing the steel member between the two molds, upper and lower pad molds 23 and 24 are actuated so as to shape opposite ends having closed cross-sections through pressing [FIG. 3(a)]. Thereafter, cylinder actuators 26 are operated so as to insert left and right cores 27 into respective opposite ends of the tubular steel member. After the insertion of the cores, the upper and lower molds 21 and 22 are actuated so as to shape a transitional portion and a middle portion through pressing, thus producing a desired tubular torsion beam [FIG. 3(b)]. Thereafter, the upper mold 21 is lifted upwards prior to removing the tubular torsion beam from the lower mold 22 using a push rod 25.

However, the conventional pressing requires a complex molding technique but nevertheless, fails to realize high processing precision, so that the pressing cannot provide a product having a precise cross-sectional shape or a uniform thickness, thus increasing the defective proportion of products.

In an effort to solve the problems of the conventional pressing, hydroforming has preferably been used in recent years. Korean Patent Laid-open Publication No. 2004-110247 discloses an example of a conventional hydroforming technique. The hydroforming technique disclosed in Korean Patent Laid-open Publication No. 2004-110247 will be described with reference to FIG. 4. As shown in FIG. 4, to produce a tubular torsion beam through hydroforming, first, a tubular steel member is placed on a lower mold 32. Thereafter, upper and lower molds 31 and 32 are actuated in cooperation with two guide molds 33, thus shaping opposite ends having a rectangular closed cross-section through pressure forming [FIG. 4(a),(b)]. After shaping the opposite ends, elliptical axial punches 36, which are attached to respective mandrel units, operated in a lengthwise direction relative to the tubular steel member, are advanced so as to seal the opposite ends of the tubular steel member. After sealing the opposite ends, actuation oil is fed into the tubular steel member through inlet holes formed through central axes of the axial punches 36, thus applying hydraulic pressure to the inner surface of the tubular steel member. Thereafter, upper and lower punches 34 and 35 are actuated so as to shape both a middle portion and transitional portions, thus producing a desired tubular torsion beam 30 through pressure forming [FIG. 4(c)].

In the hydroforming technique, pressure of the actuation oil is evenly and continuously applied to the entire inner surface of the tubular steel member, so that it is possible to precisely control the shape and thickness of a tubular torsion beam, thus remarkably reducing the defective proportion of products in comparison with the conventional pressing techniques. Thus, the technique of producing tubular torsion beams through hydroforming has been actively and variously studied recently.

To realize desired vehicle stability, a highly durable design of tubular torsion beams for suspensions has been required. In the prior art, the design of highly durable tubular torsion beams has concentrated on the use of high strength materials or thick materials as materials for the beams. However, the use of high strength materials reduces work efficiency during hydroforming and the use of thick materials increases the weights of car bodies, thus limiting the design of durable tubular torsion beams.

Accordingly, the present invention has been made keeping in mind the above problems occurring in the related art, and is intended to provide a tubular torsion beam for rear suspensions of vehicles, which is produced through hydroforming and has an optimal shape, capable of reinforcing a stress-concentrated portion of the beam, with a cross-section varying along the entire length thereof, thus having improved durability. The present invention is also intended to provide a method of manufacturing the tubular torsion beam.

SUMMARY OF THE INVENTION

In order to achieve the above object, the present invention provides a tubular torsion beam for rear suspensions of vehicles and a method of manufacturing the tubular torsion beam, in which the tubular torsion beam is produced by pressure-forming a tubular steel member through hydroforming such that the tubular torsion beam has a cross-section varying along the entire length thereof, with opposite ends having a closed cross-section and being mounted to respective trailing arms, a middle portion having a V-shaped open cross-section, and a transitional portion having a varying cross-section and connecting the middle portion to each of the opposite ends, wherein opposite ends of the tubular steel member are fed using axial punches of a hydroforming machine, so that the opposite ends of the tubular torsion beam are thicker than the middle portion.

In an aspect, an inclined offset may be formed between the middle portion and each of the transitional portions, so that both the transitional portions and the opposite ends are enlarged outwards compared to the middle portion.

In another aspect, a bead may be formed on the surface of each of the transitional portions.

The tubular torsion beam for rear suspensions of vehicles and the method of manufacturing the tubular torsion beam according to the present invention are advantageous in that the roll stiffness and roll strength of the tubular torsion beam are improved by increasing the thickness of a stress-concentrated portion of the torsion beam or by forming an offset or a bead in the stress-concentrated portion, thus realizing high durability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a tubular torsion beam for rear suspensions of vehicles and a manufacturing method thereof according to preferred embodiments of the present invention will be described in detail with reference to the accompanying drawings.

The inventor of the present invention used FEM (Finite Element Modeling) to design a durable tubular torsion beam. FEM is a method that analyzes actual arising physical variation by inputting the physical phenomena of problems to be solved, by modeling the physical phenomena with finite elements having mathematical concepts, and by simulating the physical phenomena based on the finite elements.

Finite element modeling for durable suspension design is executed as follows. A link system is modeled with beam elements, and a tire, a wheel and a brake are modeled with concentrated mass elements in consideration of the characteristics of mass and inertia. Further, a suspension spring and a shock absorber are modeled with linear stiff spring elements in consideration of equivalent damping stiffness relative to a maximum damping coefficient. Thus, the finite element modeling is executed so as to be almost equal to the actual behavior of the suspension.

A bush is modeled with linear stiff spring elements between two nodes of a connected part in consideration of linear stiffness values obtained through tests. Further, a position at which a bush sleeve is pivoted to a vehicle body using the bush, is connected over all of the nodes of an actually connected part using the beam elements, such that a load can be uniformly distributed over the portion. Structural parts, such as a knuckle, a trailing arm, and a torsion beam, which may be deformed by the direct application of a load thereto and impose effects on the behavior characteristics of the suspension, are modeled with solid elements or shell elements.

Figure 1:
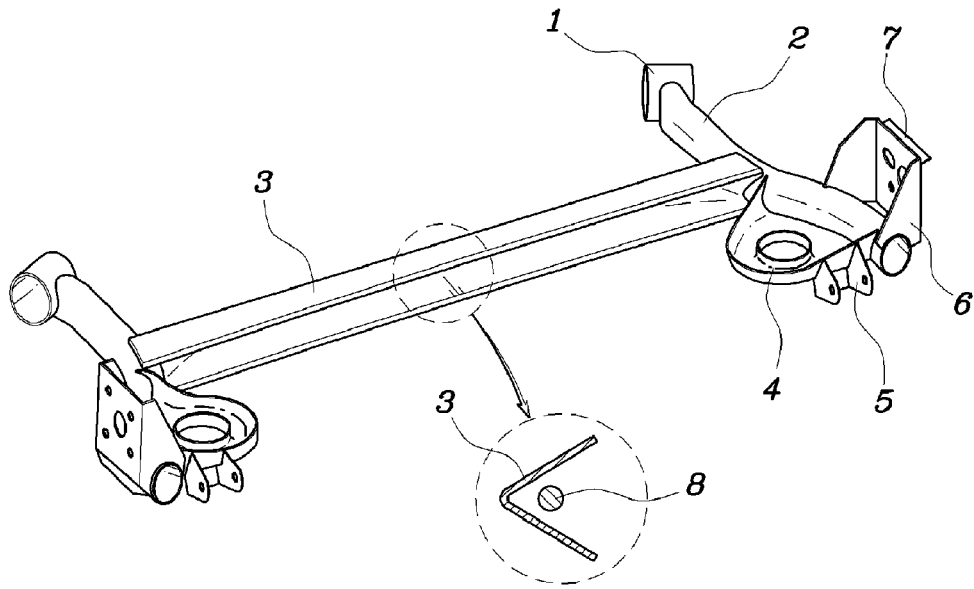
FIG. 1 is a perspective view illustrating a rear suspension for vehicles having a plate-type torsion beam.
Figure 2:
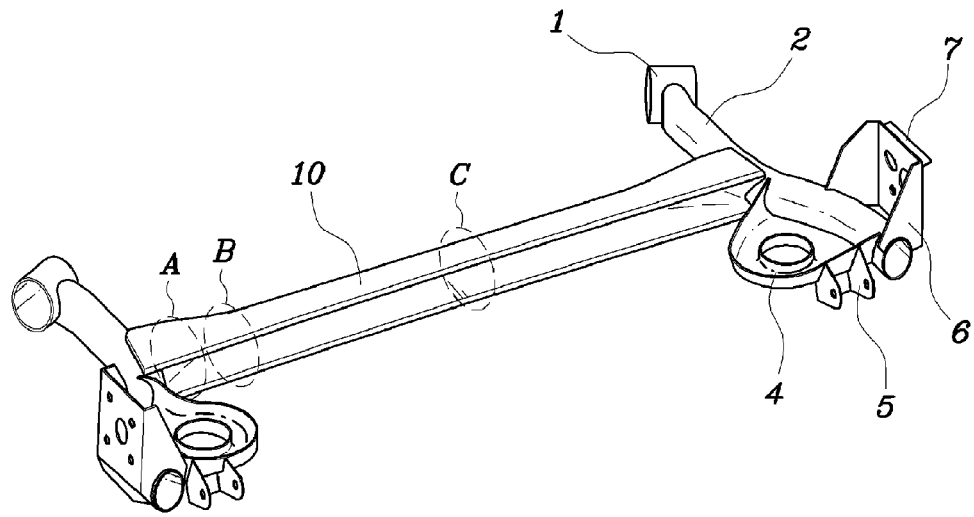
FIG. 2 is a perspective view illustrating a rear suspension for vehicles having a conventional tubular torsion beam along with enlarged cross-sections (A)-(C)
Figure 2:
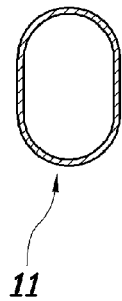
Figure 2:
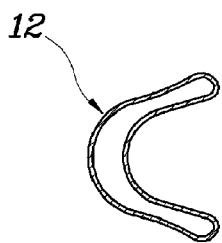
Figure 2:
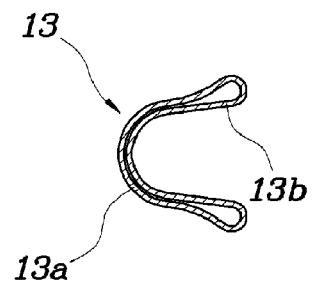
Figure 3:
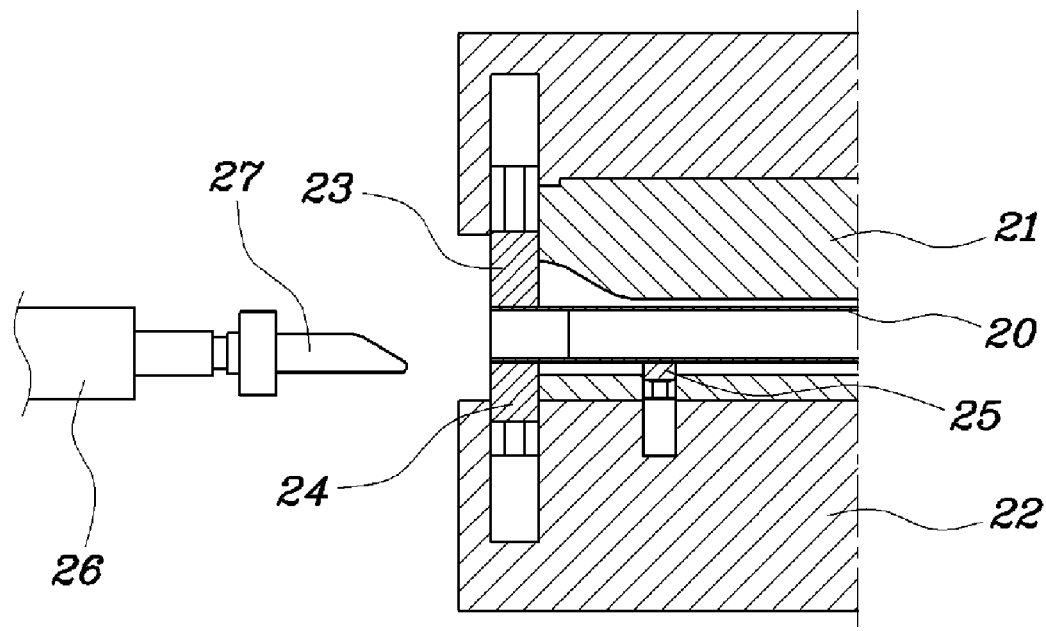
FIGS. 3(a) and (b) are views illustrating a process of manufacturing a conventional tubular torsion beam according to an embodiment of the prior art.
Figure 3:
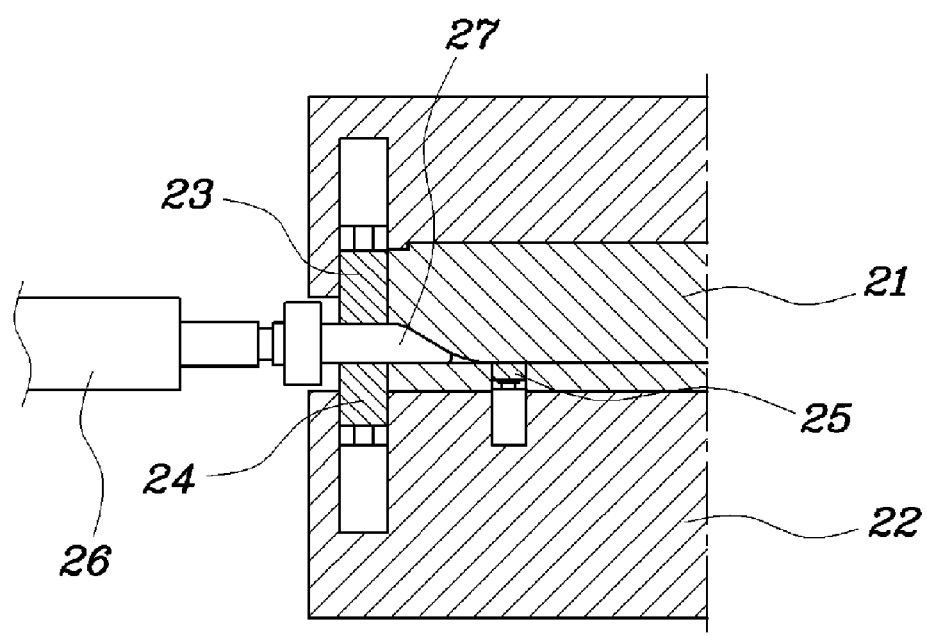
Figure 4:
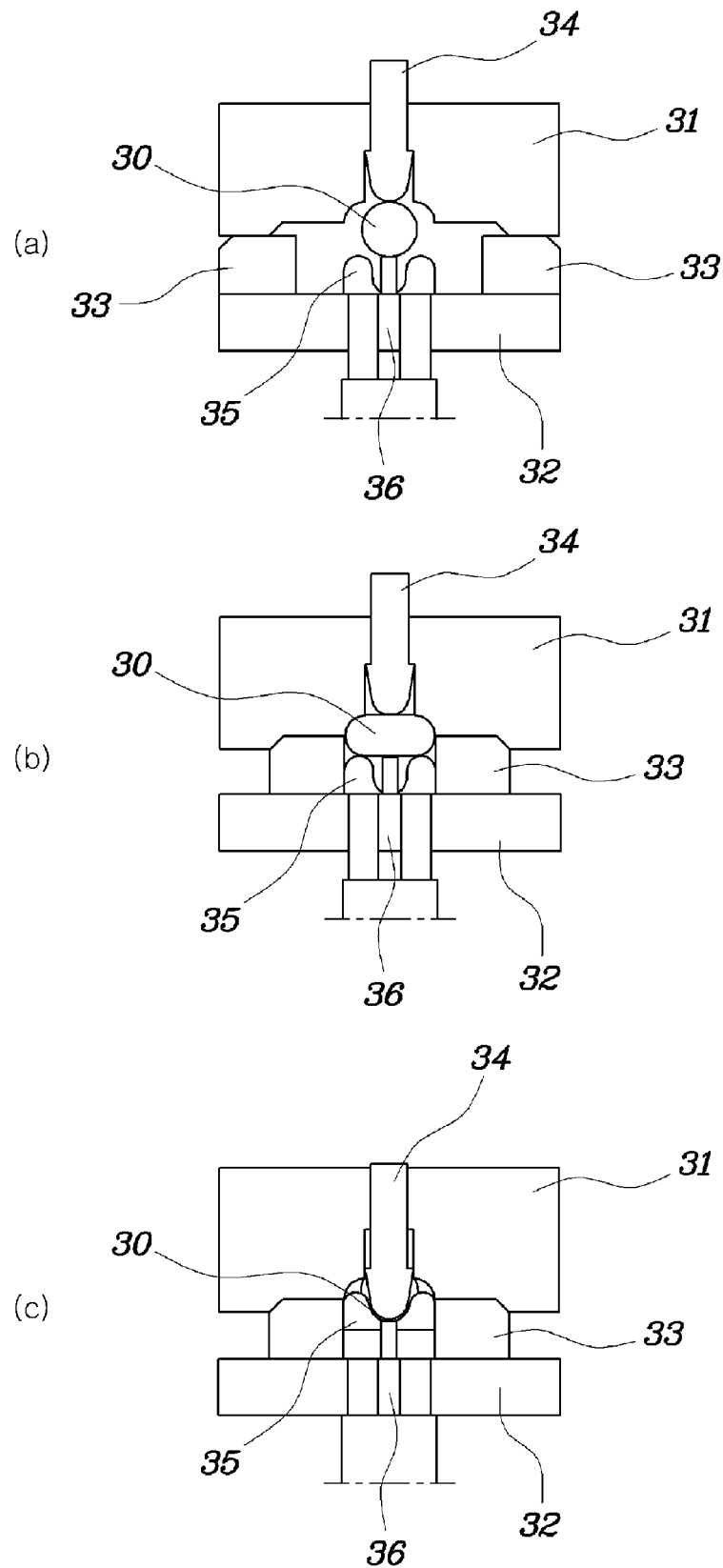
FIGS. 4(a)-(c) are views illustrating a process of manufacturing a conventional tubular torsion beam according to another embodiment of the prior art.
Figure 5:
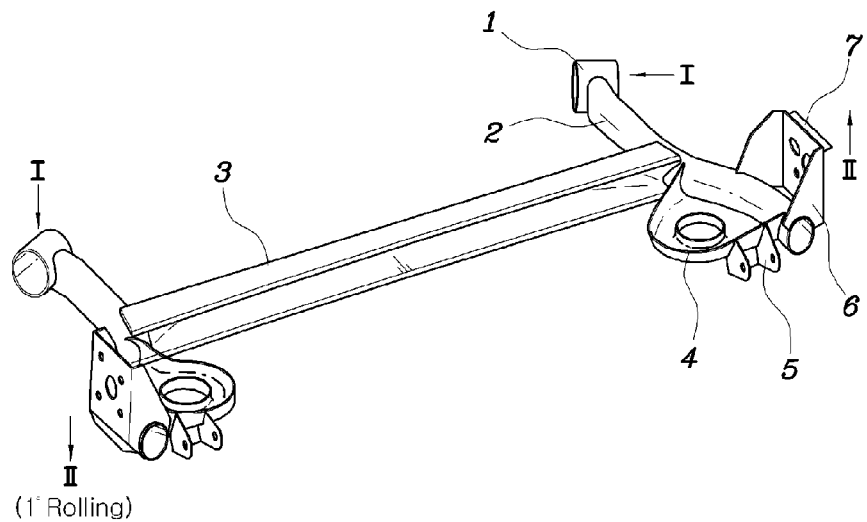
FIGS. 5(a) and (b) are perspective views illustrating finite element modeling of torsion beams.
Figure 5:
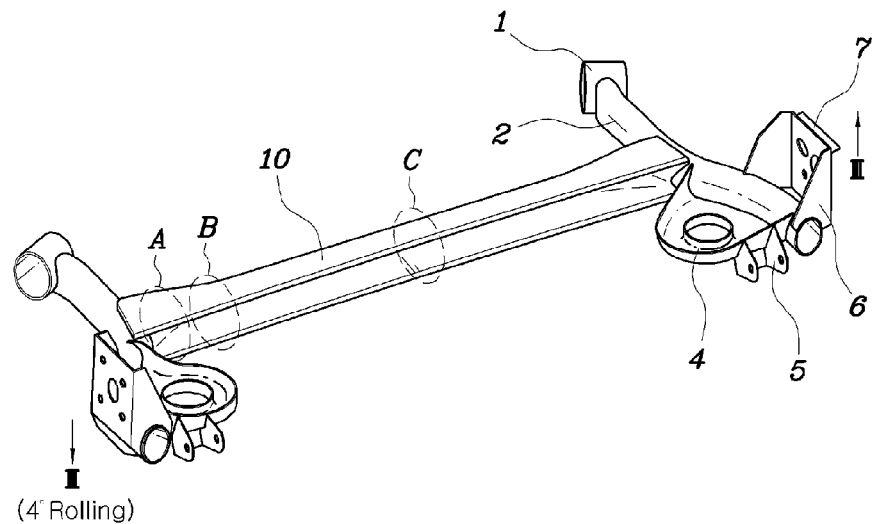

FIG. 5 illustrates respective methods of determination of roll stiffness of a plate-type torsion beam 3 and determination of roll strength of a tubular torsion beam 10 in suspensions through FEM so as to design a durable torsion beam suspension according to the present invention. A bush sleeve 1, a trailing arm 2, a torsion beam 3 or 10, a spring seat 4, a damper bracket 5, a wheel carrier 6 and a spindle plate 7, which constitute a torsion beam suspension, are modeled with respective finite elements according to the above-mentioned suspension modeling method.

Figure 5A:
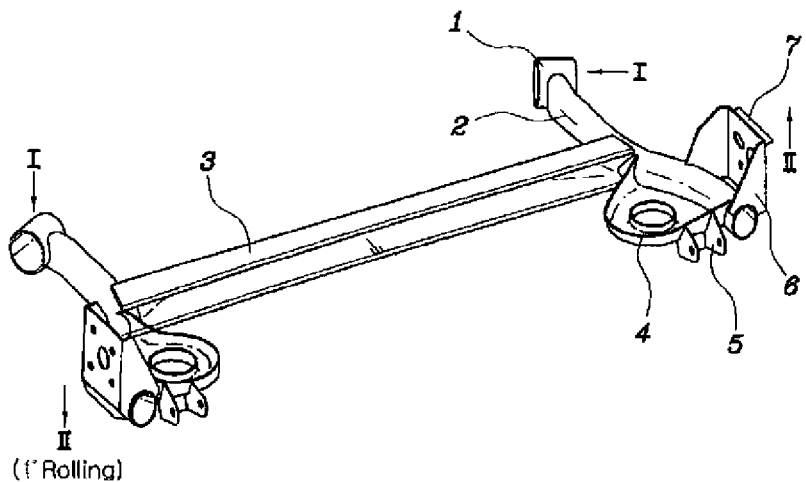

Thereafter, roll stiffness is determined by calculating reaction forces at respective nodes in a restricted state in which the bush sleeves 1 are set to fixing points (I) and 1° rolling (II) (Z=12.96 mm) is executed in a direction perpendicular to the central axis between two spindle plates 7 [FIG. 5(a)]. Further, roll strength is determined by measuring the stress distribution on the torsion beam in a restricted state, in which the bush sleeves 1 are set to fixing points (I) and 4° rolling (III) (Z=51.92 mm) is executed in a direction perpendicular to the central axis between the two spindle plates 7 [FIG. 5(b)].

Figure 5B:
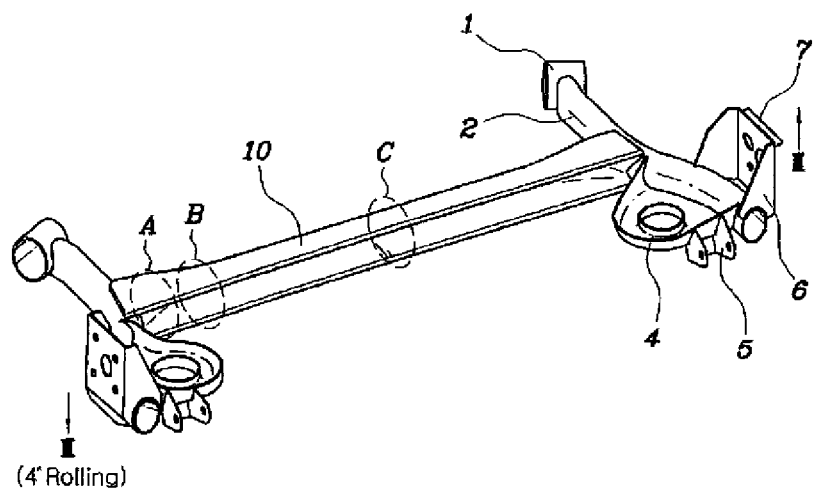
Figure 6:
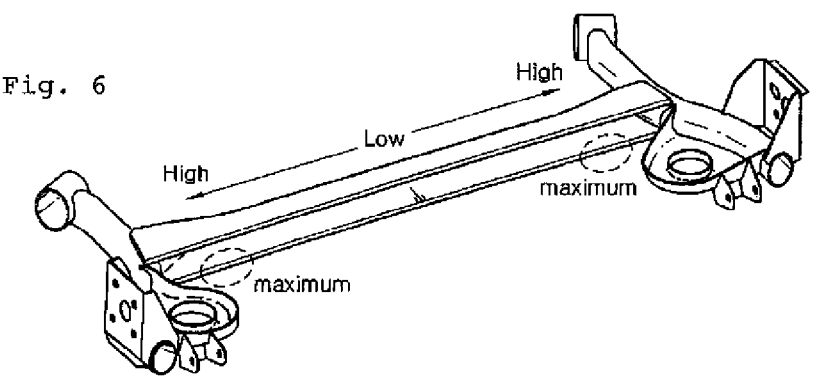

FIG. 5(a) illustrates a method of determining roll stiffness of a suspension having the plate-type torsion beam 3, while FIG. 5(b) illustrates a method of determining roll strength of a suspension having the tubular torsion beam 10. However, it should be understood that both the roll stiffness and the roll strength of each of the plate-type torsion beam 3 and the tubular torsion beam 10 may be determined through FEM. In the process of determination of roll stiffness and roll strength of the tubular torsion beam 10, the roll stiffness and the roll strength are measured while changing the thickness of the tubular torsion beam 10 within a range from 2.6 mm to 4.0 mm, and the results are given in Table 1.

TABLE 1

| Thickness (mm) | Weight (kg) | Roll stiffness (Nm/deg) | Roll strength (Max., Mpa) | Type of torsion beam |
|---|---|---|---|---|
| 6.0 | 19.72 | 227 | 299 | plate-type |
| 2.3 | 16.71 | 405 | 442 | tubular |
| 2.6 | 17.57 | 496 | 424 | tubular |
| 2.8 | 18.15 | 558 | 420 | tubular |
| 3.0 | 18.72 | 624 | 414 | tubular |
| 3.2 | 19.20 | 690 | 408 | tubular |
| 3.4 | 19.86 | 759 | 400 | tubular |
| 3.6 | 20.44 | 830 | 392 | tubular |
| 3.8 | 21.01 | 903 | 384 | tubular |
| 4.0 | 21.58 | 977 | 375 | tubular |

As shown in Table 1, when a tubular torsion beam is used, it can realize higher roll stiffness than that of a plate-type torsion beam even though it is thinner (lower weight). For example, when a plate-type torsion beam having a 6.0 mm thickness is used, it weighs 19.72 kg and roll stiffness of 227 Nm/deg can be realized. However, when a tubular torsion beam having a 2.6 mm thickness is used, it weighs 17.57 kg and higher roll stiffness of 496 Nm/deg can be realized. Thus, when a tubular torsion beam is used, it is possible to design a suspension having excellent durability while reducing the weight of the suspension, so that torsion beam suspensions have been preferably used in recent years.

Further, when compared to a plate-type torsion beam, the tubular torsion beam has higher roll strength. Roll strength means maximum stress that acts in the torsion beam, so that the durability of the torsion beam is increased in inverse proportion to the maximum stress. This is because when the maximum stress acting on the torsion beam exceeds the yield stress of the material of the torsion beam, the torsion beam may be plastically deformed during the operation of a vehicle, and fatally affect vehicle stability. Thus, it is necessary to design the roll strength of a torsion beam such that it is less than the yield stress of a material of the torsion beam as less as possible.

In the prior art, to reduce the roll strength of a tubular torsion beam, a material having a large thickness or a high strength material having high yield stress is used as the material of the tubular torsion beam. However, the use of a thick material or a high strength material cannot solve the problem. In other words, when a material having a large thickness is used, the weight of the torsion beam is increased, thus reducing the running performance of a vehicle. Further, when a high strength material is used, workability during a forming process is reduced.

Figure 6:
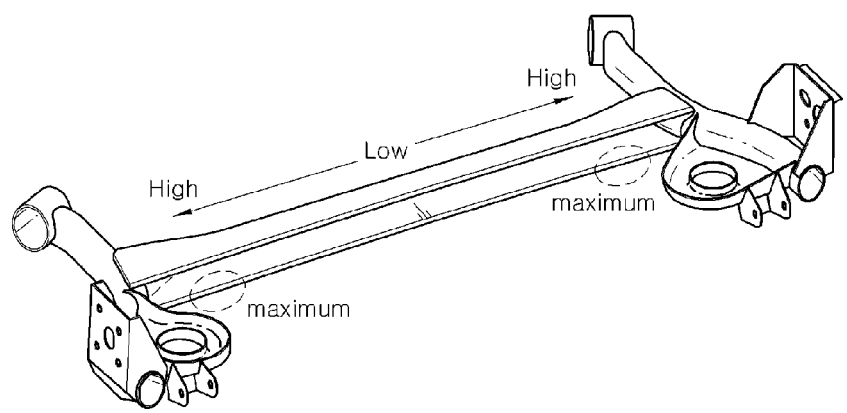
FIG. 6 is a view illustrating stress concentration according to finite element modeling of a torsion beam.
Figure 7:
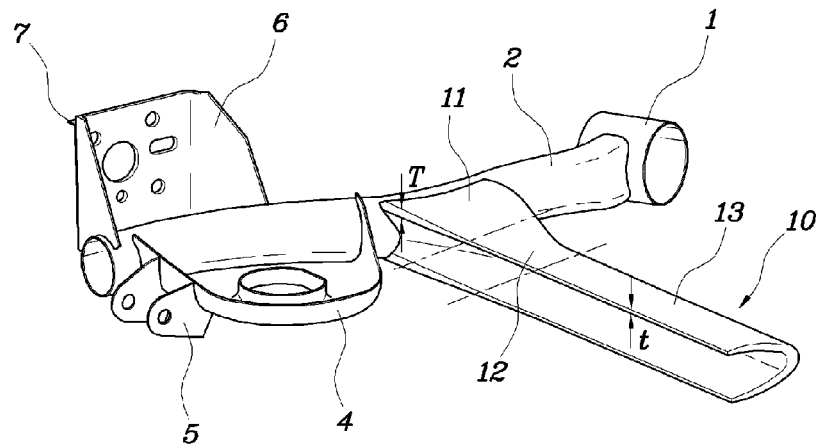
FIGS. 7(a) and (b) are perspective views illustrating the construction of tubular torsion beams according to embodiments of the present invention.
Figure 7:
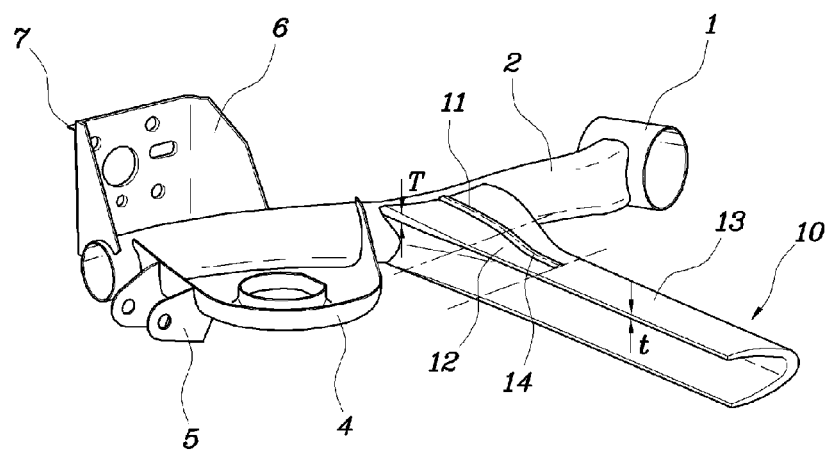

Thus, while keeping in mind the above problems, the inventor of the present invention has studied a method of efficiently reducing the roll strength of a tubular torsion beam while using the same material as in the prior art. The high roll strength of a tubular torsion beam results from the fact that the shape of the tubular torsion beam repeatedly varies along the lengthwise direction thereof, so that stress-concentrated portions are formed in the torsion beam. The above-mentioned fact can be clearly understood from FIG. 6, which shows a stress distribution in a tubular torsion beam obtained through a definite element modeling. As shown in FIG. 6, the stress in the tubular torsion beam 10 is increased in the direction from the middle portion to the opposite ends and, particularly, the maximum stress (roll strength) acts in a lower part of the transitional portion, at which the V-shaped open cross-section is changed into the closed cross-section.

According to the first embodiment of the present invention, a design for a durable tubular torsion beam, which can increase the roll stiffness of the torsion beam and can reduce the roll strength thereof, based on the above-mentioned stress distribution, thus realizing excellent durability of the torsion beam, can be provided.

Figure 7A:
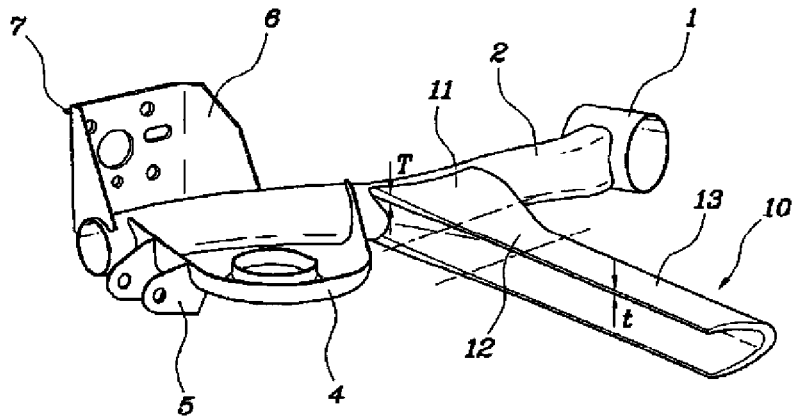
Figure 7B:
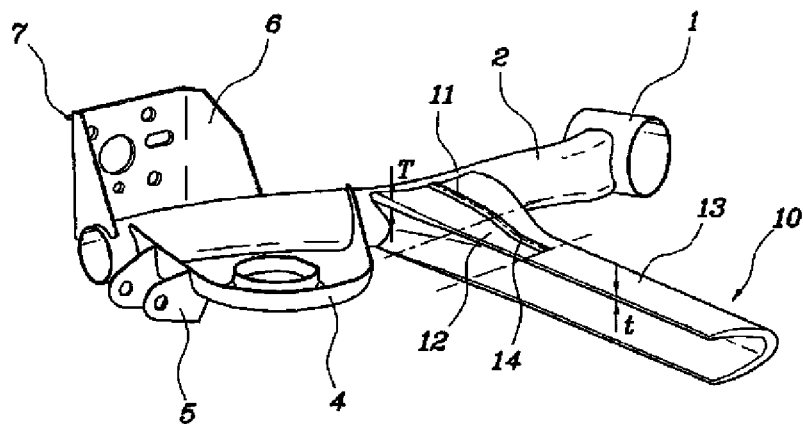
Figure 8:
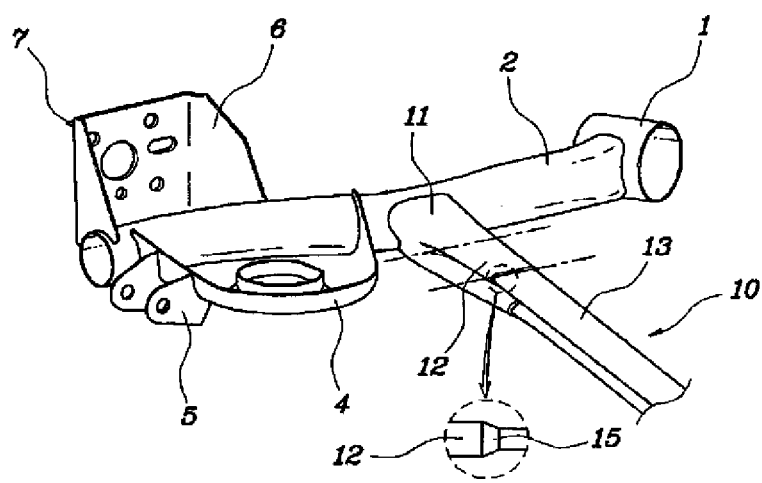
Figure 9:
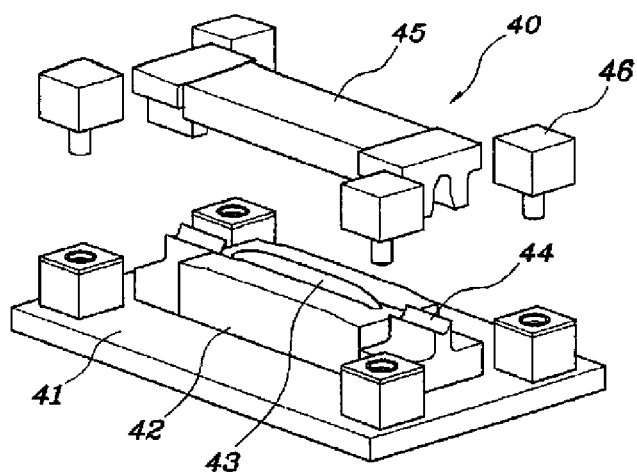
Figure 10:
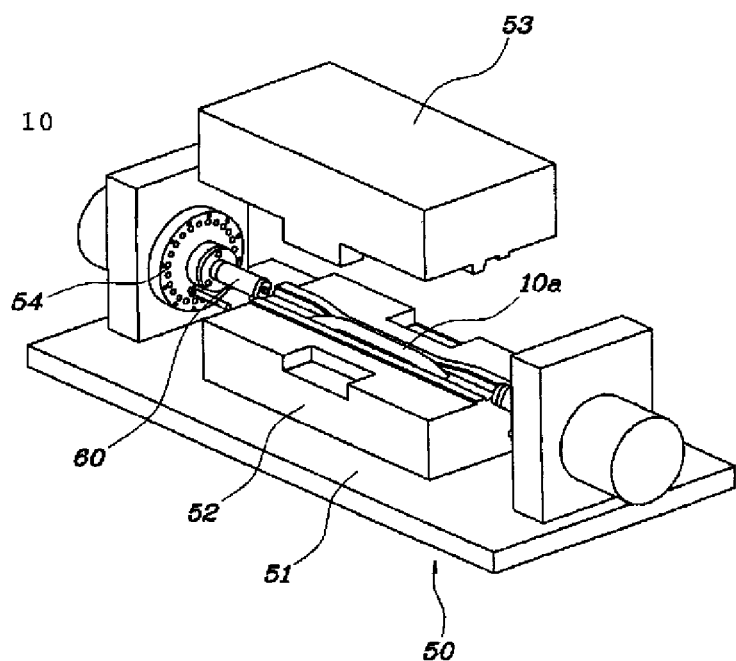
Figure 11:
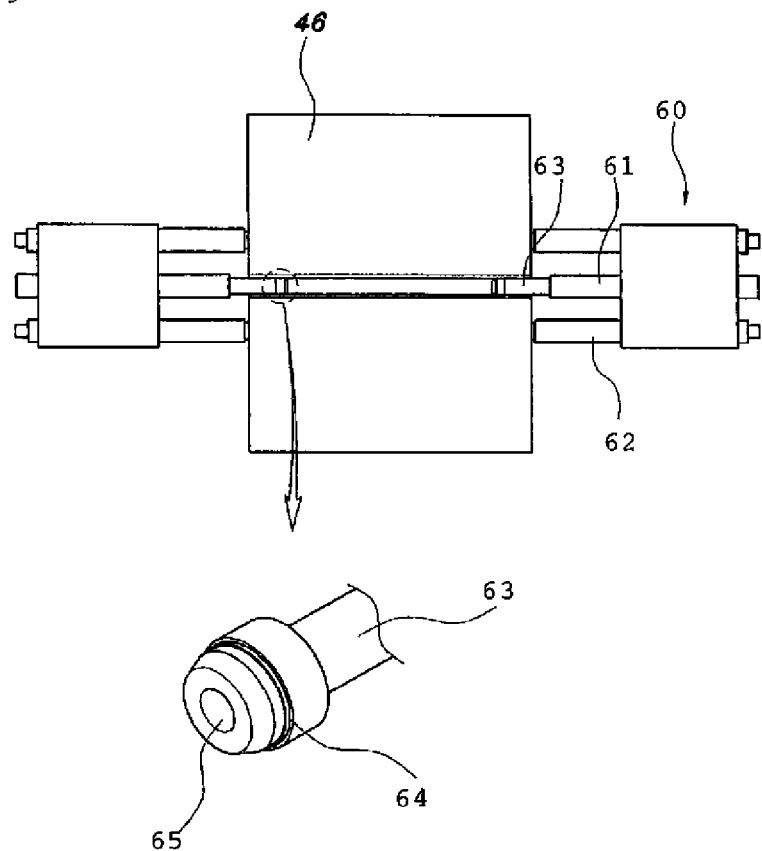

Described in detail, as shown in FIG. 7(a), the thickness T of each of the opposite ends 11, which has higher roll strength in the tubular torsion beam 10, is increased to be higher than the thickness t of the middle portion. Further, as shown in FIG. 7(b), a bead 14 is formed on the surface of the transitional portion 12, at which the maximum stress acts. The bead 14 may be exclusively formed on the transitional portion 12, at which the maximum stress acts, or may be formed so as to extend from the transitional portion 12 to each of the opposite ends 11.

To measure the effects of the above-mentioned durable design, roll stiffness and roll strength are measured using tubular torsion beam samples made of a material having 2.6 mm thickness while varying the thickness of the opposite ends 11 from 2.60 mm to 3.90 mm and dividing the samples into two groups having respective beads or no beads on the surface of the transitional portions, and the results are given in Table 2.

TABLE 2

| Thickness (mm) | | No Bead | | Having Bead | |
|---|---|---|---|---|---|
| middle portion | opposite ends | roll stiffness (Nm/deg) | roll strength (MPa) | roll stiffness (Nm/deg) | roll strength (MPa) |
| 2.60 | 2.60 | 342 | 390 | 378 | 386 |
| 2.60 | 2.86 | 363 | 377 | 387 | 368 |
| 2.60 | 3.12 | 382 | 365 | 397 | 364 |
| 2.60 | 3.38 | 400 | 354 | 412 | 357 |
| 2.60 | 3.64 | 415 | 351 | 430 | 353 |
| 2.60 | 3.90 | 430 | 350 | 461 | 353 |

As shown in Table 2, when a tubular torsion beam is designed such that the opposite ends and the middle portion thereof have a thickness of 2.6 mm and no bead is formed on the surface of the transitional portion, in other words, when the durable design of the present invention is not adapted to the tubular torsion beam, the roll stiffness thereof is measured to be 342 Nm/deg and the roll strength thereof is measured to be 390 MPa [for reference, the difference in roll stiffness and roll strength between the tubular torsion beam 2.6 mm thick in Table 2 and the tubular torsion beam 2.6 mm thick in Table 1 is induced by the shape optimization.

When the thickness of the opposite ends of the above-mentioned tubular torsion beam is increased to 3.90 mm, the roll stiffness thereof is increased to 430 Nm/deg and the roll strength is reduced to 350 Mpa. That is, when the thickness of the opposite ends of the tubular torsion beam is increased relative to the thickness of the middle portion according to the durable design of the present invention, the roll stiffness is increased and the roll strength is reduced, so that the durability of the tubular torsion beam can be improved.

Further, when the thickness of the opposite ends is increased to 3.90 mm in a state in which a bead is formed on the surface of the transitional portion, roll stiffness is increased in comparison with a tubular torsion beam having the same thickness and no bead. In the above case, until the thickness of the opposite ends has been increased to 3.12 mm, the roll strength is reduced in comparison with a tubular torsion beam having the same thickness and no bead. However, in the case where the thickness of the opposite ends exceeds 3.38 mm, the roll strength is increased in comparison with a tubular torsion beam having the same thickness and no bead. This may result from the fact that when a thickness difference between the middle portions and the opposite ends of the tubular torsion beam exceeds a predetermined reference level, stress is concentrated on the bead.

Described in detail, it is preferred that the thickness of the opposite ends be increased to be 1.2~1.5 times the thickness of the middle portion. As shown in Table 2, when tests are executed while the thickness of the opposite ends of the tubular torsion beam is increased relative to the thickness 2.6 mm of the middle portion so as to become 2.86 mm, which is 1.1 times the thickness 2.6 mm of the middle portion, 3.12 mm, which is 1.2 times thereof, 3.38 mm, which is 1.3 times thereof, 3.64 mm, which is 1.4 times thereof, and 3.90 mm, which is 1.5 times thereof, it is noted that the roll stiffness and the roll strength are improved.

However, when the thickness of the opposite ends is increased to 2.86 mm, which is 1.1 times the thickness 2.6 mm of the middle portion, the improvement in the roll stiffness and the roll strength is not recognized as significant. Further, in the case where the thickness of the opposite ends is increased to become 1.6 times (no data), the feeding distance of an axial punch of a hydroforming machine is excessively long, thus causing a problem in that folds may be formed in opposite ends of the tubular steel member. The hydroforming method, which includes the control of the feeding distance of the axial punch, will be described in detail later herein, with reference to FIG. 9 through FIG. 12.

In the tubular torsion beam, when the bead 14, formed on each of the transitional portions 12, is configured to have a ridge shape not exceeding a height of 35 mm, a width of 125 mm and a length of 550 mm, and having a radius of curvature equal to or higher than 2.2 times the thickness of the tubular steel member, the durability of the tubular torsion beam can be optimally improved. In other words, when the height of the bead 14 exceeds 35 mm, the width thereof exceeds 125 mm or the length thereof exceeds 550 mm, the bead 14 acts as a stress-concentrated portion, thus reducing the durability of the tubular torsion beam. Further, when the radius of curvature of the bead 14 is less than a value that results from 2.2 times the thickness of the tubular steel member, the ridge of the bead 14 becomes too sharp, so that it is almost impossible to form a precise bead shape through hydroforming.

According to the above-mentioned results, it is noted that, when the thickness of the opposite ends of the tubular torsion beam is increased relative to the thickness of the middle portion according to the durable design of the present invention, the roll stiffness of the tubular torsion beam can be increased and the roll strength thereof can be reduced, thus significantly improving the durability of the tubular torsion beam. Further, when a bead is formed on the surface of each of the transitional portions, the roll stiffness can be increased and roll strength may be increased or reduced according to the thickness difference between the middle portion and the opposite ends. Thus, during a design of a durable tubular torsion beam, when the thickness of the opposite ends of the tubular torsion beam is increased relative to the thickness of the middle portion, and a bead is formed on the surface of each of the transitional portions in consideration of the thickness difference between the middle portion and the opposite ends, excellent roll stiffness and excellent roll strength of the tubular torsion beam can be realized, resulting in optimal durability of the torsion beam.

Meanwhile, according to a second embodiment of the present invention, a durable design capable of improving the durability of a tubular torsion beam 10 by reinforcing the lower part of each transitional portion, in which maximum stress (roll strength) acts, as shown in FIG. 6, can be provided.

Figure 8:
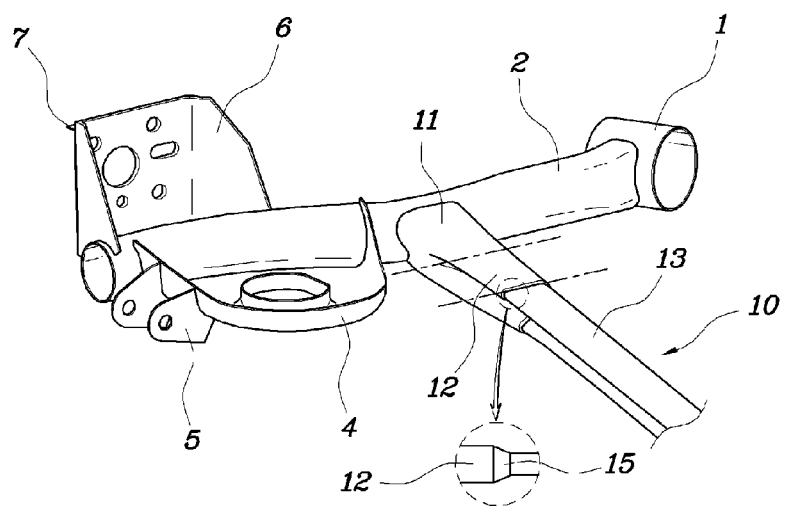
FIG. 8 is a perspective view and a cross-section illustrating the construction of a tubular torsion beam according to another embodiment of the present invention.

Described in detail, as shown in FIG. 8, in a tubular torsion beam 10 produced by pressure-forming a tubular steel member through hydroforming such that the torsion beam 10 has a cross-section varying along the entire length thereof, with opposite ends 11 having a closed cross-section and mounted to respective trailing arms 2, a middle portion 13 having a V-shaped open cross-section, and a transitional portion 12 having a varying cross-section and connecting the middle portion 13 to each of the opposite ends 11 while executing a natural transition from the middle portion to the opposite end, an inclined offset 15 is formed between the middle portion 13 and each of the transitional portions 12, so that both the transitional portions 12 and the opposite ends 11 are enlarged outwards compared to the middle portion 13.

When the inclined offset 15 is formed in each of the transitional portions 12 of the tubular torsion beam 10, in which the maximum stress acts, the closed cross-sectional areas of both the transitional portions 12 and the opposite ends 11 are increased, and the bending stiffness thereof can be increased in proportion to the increase in the closed cross-sectional areas, so that the durability of the torsion beam can be improved. When the offset 15 is configured to have right-angled corners, the corners may act as stress-concentrated portions, so that it is preferred that the offset 15 be configured to have an inclined shape.

Further, it is preferred that the increase in the circumference of the tubular torsion beam due to the offset 15 be within 35% of the initial circumference of the tubular steel member and that the height difference between the middle portion 13 and each transitional portion 12 due to the offset 15 not exceed 50 mm.

According to the hydroforming method of the present invention, high pressure actuation oil is fed into a tubular steel member seated in a cavity between molds, thus pressurizing the inner surface of the tubular steel member and expanding the wall of the steel member, and thus forming a desired tubular torsion beam, the shape of which varies along the entire length thereof. Therefore, a limitation exists in the process of expanding only the transitional portions 12 and the opposite ends 13 by forming the offset 15 in a tubular steel member having a constant thickness, so that it is necessary to control both the increase in the circumference and the height difference such that they do not exceed the above-mentioned values. In other words, when the increase in the circumference of the tubular torsion beam due to the offset 15 exceeds 35% of the initial circumference of the tubular steel member, or the height difference between the middle portion 13 and each transitional portion 12 due to the offset 15 exceeds 50 mm, breakage may occur in the portion having the offset 15.

Hereinbelow, the manufacturing method of a tubular torsion beam for rear suspensions of vehicles according to the present invention will be described with reference to FIG. 9 through FIG. 12.

The manufacturing method according to the first embodiment of the present invention comprises the steps of: preforming a tubular steel member having a circular cross-section prior to seating the tubular steel member in a mold of a hydroforming machine; preparing hydroforming by seating the preformed tubular steel member in a lower mold of the hydroforming machine and by lowering an upper mold so as to close the molds; and hydroforming a tubular torsion beam by sealing opposite ends of the preformed tubular steel member, seated in the cavity between the upper and lower molds, using axial punches placed at opposite ends of the molds, by feeding actuation oil into the preformed tubular steel member seated in the molds so as to pressurize the inner surface of the tubular steel member, thus forming the tubular torsion beam having opposite ends having a closed cross-section and mounted to trailing arms, a middle portion having a V-shaped open cross-section, and a transitional portion having a varying cross-section and connecting the middle portion to each of the opposite ends while executing a natural transition from the middle portion to the opposite end, and, at the same time, by feeding the opposite ends of the tubular steel member using the axial punches so as to increase the thickness of the opposite ends of the tubular torsion beam compared to the middle portion.

Figure 9:
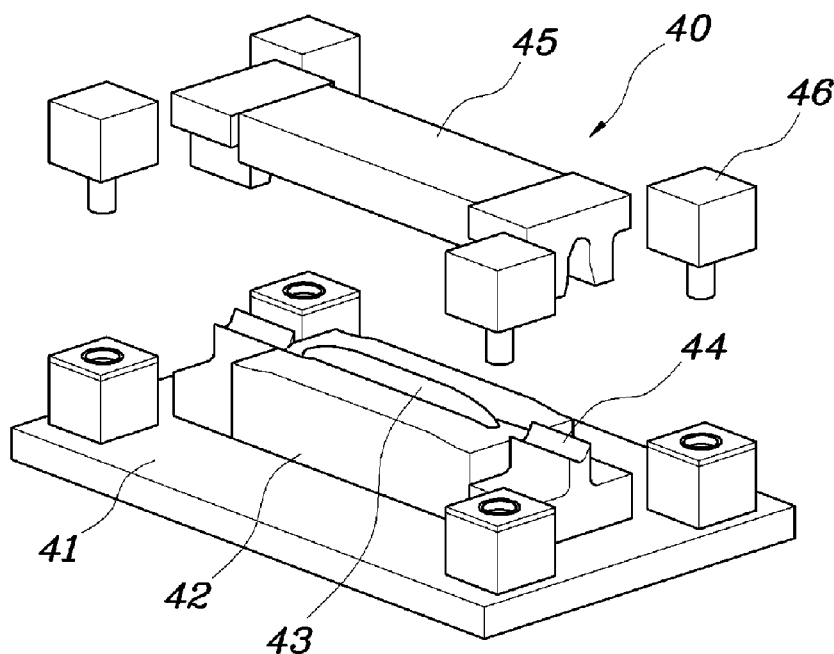
FIG. 9 is a perspective view illustrating a preforming machine according to the present invention.

Hereinbelow, the preforming step will be described in detail, with reference to FIG. 9, showing a preforming machine.

First, the preforming machine 40 is a conventional press machine, which comprises a lower mold 42 securely mounted on a fixed base 41, a lower punch 43 provided on the upper surface of the lower mold 42 so as to form a V-shaped concave part of a tubular torsion beam, and a holder 44 provided on each end of the lower mold 42 so as to hold a tubular steel member without allowing the steel member to move after an upper mold 45 is lowered to close the lower mold 42. In the above state, the upper mold 45 is placed on the lower mold 42 such that it can be moved upwards or downwards within a predetermined stroke by a plurality of cylinder actuators 46 placed around respective corners of the upper mold 45. A depression for forming a V-shaped convex part of the tubular torsion beam is formed on the lower surface of the upper mold 45.

A tubular steel member, having a circular cross-section, is preformed using the preforming machine having the above-mentioned construction prior to seating the tubular steel member in a cavity between molds of a hydroforming machine. The hydroforming machine is a machine that feeds high pressure actuation oil into a preformed tubular steel member seated in a cavity between molds so as to pressurize the inner surface of the preformed tubular steel member and expand the wall of the steel member, as will be described in detail later herein, so that the hydroforming machine has a limitation in its forming capacity and, therefore, it cannot shape a tubular material having a circular cross-section into a desired final shape at one time. Further, the upper and lower molds of the hydroforming machine are provided with a plurality of curved surfaces corresponding to the final shape of a tubular torsion beam, so that a tubular steel member having a circular cross-section cannot be stably seated in the cavity between the upper and lower molds. Thus, in the present invention, the tubular steel member is preformed to have a shape similar to that of a desired tubular torsion beam prior to executing a hydroforming step.

Figure 10:
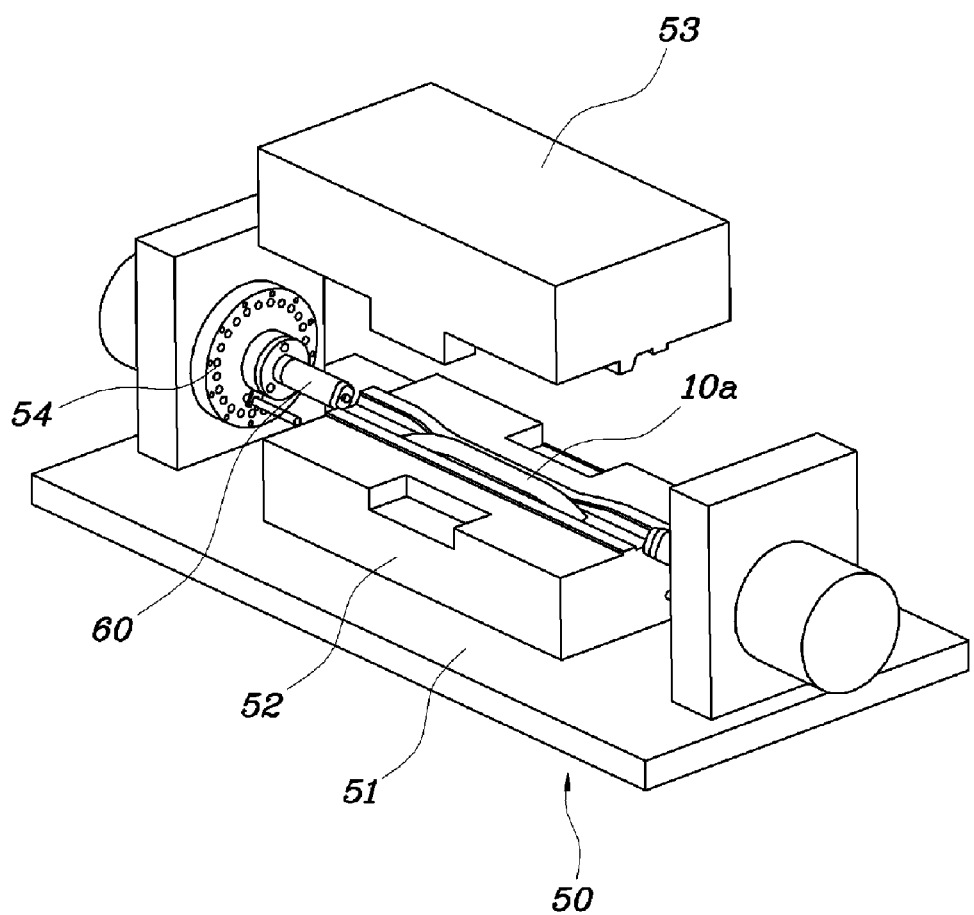
FIG. 10 is a perspective view illustrating a hydroforming machine according to the present invention.

Hereinbelow, both the hydroforming preparation step and the hydroforming step will be described in detail with reference to FIG. 10, which shows a hydroforming machine.

The hydroforming machine 50 comprises a lower mold 52, which is securely mounted on a fixed base 51 so as to seat a preformed tubular steel member 10a on the upper surface thereof. On the upper surface of the lower mold 52, a protrusion for finally forming the V-shaped concave part of the tubular torsion beam is formed. An upper mold 53 is placed on the lower mold 52 such that the upper mold 53 can move upwards or downwards within a predetermined stroke. On the lower surface of the upper mold 53, a depression for finally forming the V-shaped convex part of the tubular torsion beam is formed. Further, at opposite ends of the two molds 52 and 53, axial punches 60 for closing the cavity between the two molds 52 and 53, so as to prevent the leakage of actuation oil from the molds, and hydraulic axial cylinder actuators 54, for actuating respective axial punches 60 so as to feed the tubular steel member, are provided. The construction and operation of the axial punches 60 will be described in detail later herein with reference to FIG. 11 and FIG. 12.

To manufacture a tubular torsion beam using the preforming machine having the above-mentioned construction, a preformed tubular steel member 10a is seated on the lower mold 52 of the hydroforming machine and the upper mold 53 is lowered so as to close the molds. In the above state, to prevent the upper mold 53 from being lifted upwards by the high pressure applied to the preformed tubular steel member 10a, a high press load is applied to the upper mold (hydroforming preparation step).

Thereafter, the opposite ends of the preformed tubular steel member seated in the cavity between the upper and lower molds are sealed by the axial punches provided at the opposite ends of the molds, and actuation oil is fed into the preformed tubular steel member seated in the molds, thus pressurizing the inner surface of the preformed tubular steel member 10a. Thus, a tubular torsion beam, which has opposite ends 11 that have closed cross-sections and are mounted to trailing arms, a middle portion 13 having a V-shaped open cross-section, and a transitional portion 12 having a varying cross-section and connecting the middle portion to each of the opposite ends while executing a natural transition from the middle portion to the opposite end, is formed, and, at the same time, the opposite ends of the preformed tubular steel member 10a are fed using the axial punches 60, thus increasing the thickness of the opposite ends 11 compared to the middle portion 13 (hydroforming step).

Hereinbelow, a method of increasing the thickness of the opposite ends of the tubular torsion beam will be described in detail. A conventional pressing method cannot realize precise shape control, so that it is difficult to increase the thickness of only the opposite ends of a tubular torsion beam through the conventional pressing method. In an effort to solve the problem, the inventor of the present invention has developed a method of increasing the thickness of only the opposite ends of a tubular torsion beam using the axial punches of a hydroforming machine.

Figure 11:
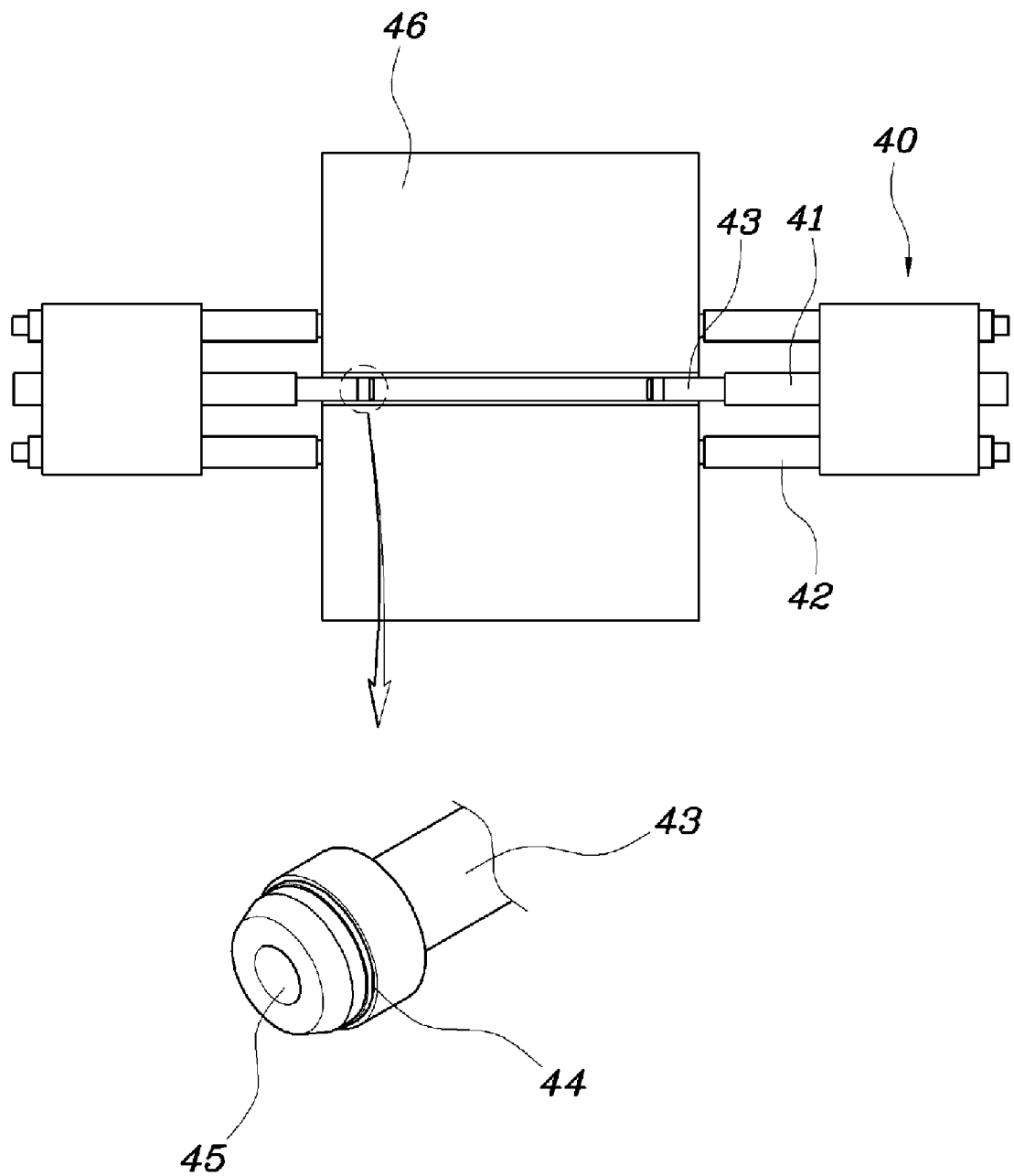
FIG. 11 is a side view and an enlarged perspective view illustrating an axial punch used in the hydroforming machine according to the present invention.

Each of the axial punches 60 used in the present invention comprises a cylinder rod 61, provided in the front of a body, and a support bar 62 provided on each side of the cylinder rod 61, as shown in FIG. 11. Further, a punching tip 63 is mounted to the end of the cylinder rod 61 such that the tip 63 can be moved forwards and backwards by a cylinder actuator installed in the body. An inlet hole 65 for feeding actuation oil is formed through a central axis of the punching tip 63, with a close contact surface 64 formed around the inlet hole 65 so as to come into contact with an associated end of a tubular steel member and seal the interior of the tubular steel member.

Figure 12:
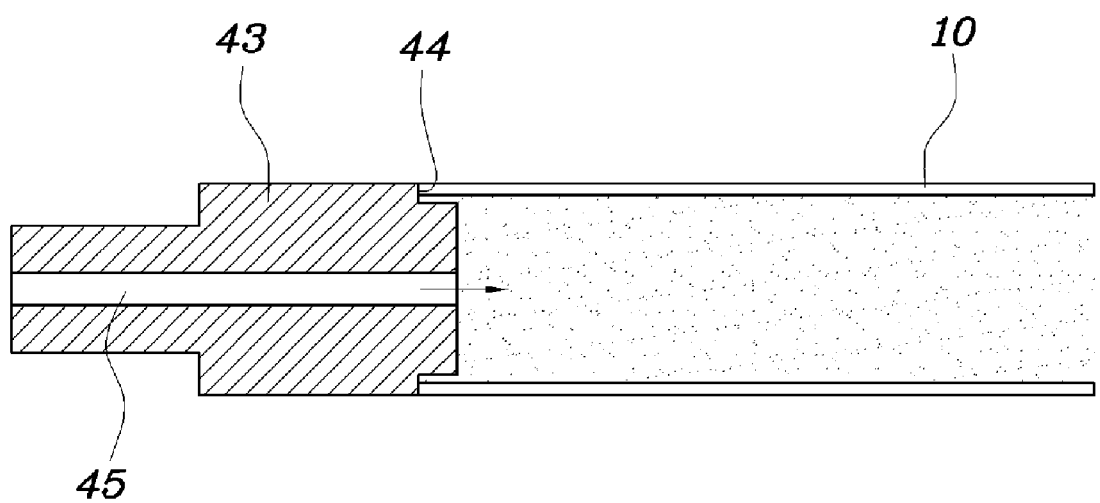
FIGS. 12(a) and (b) are cross-sectional views illustrating a tubular torsion beam manufacturing method using the axial punch of FIG. 11.
Figure 12:
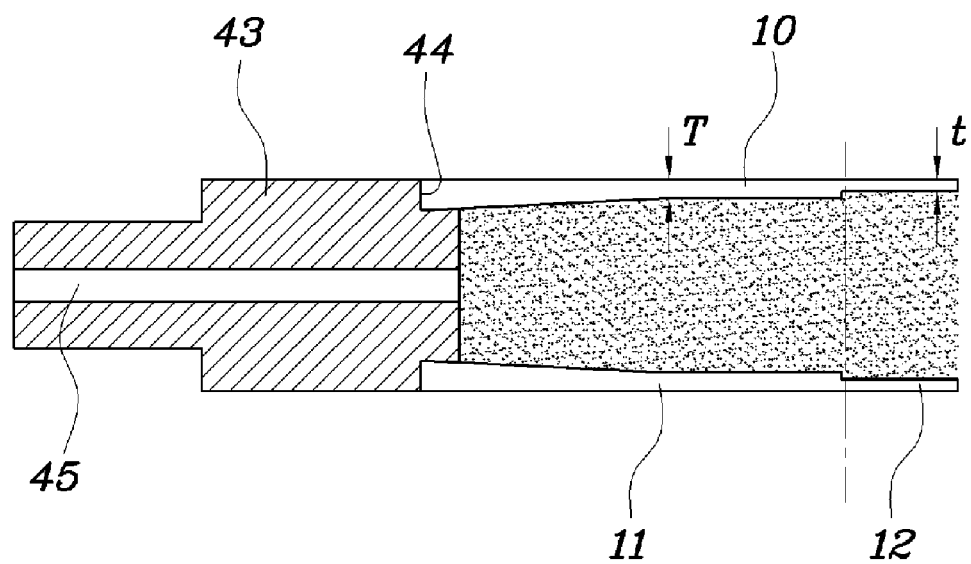
Figure 1:
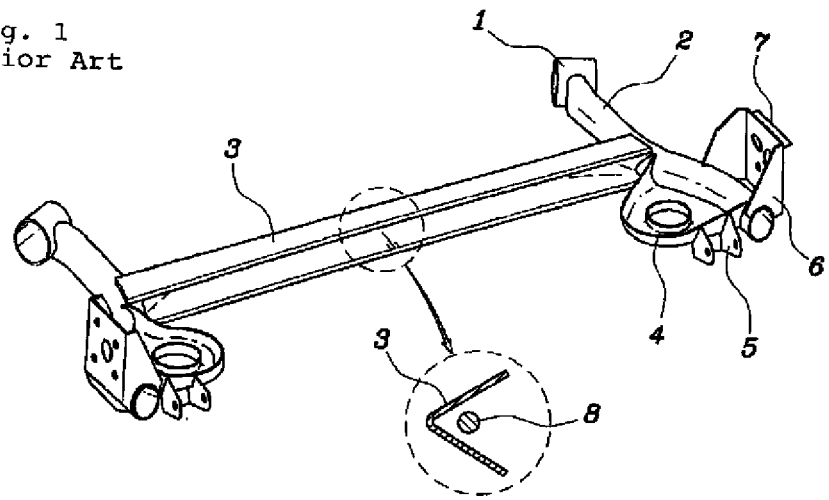
Figure 2:
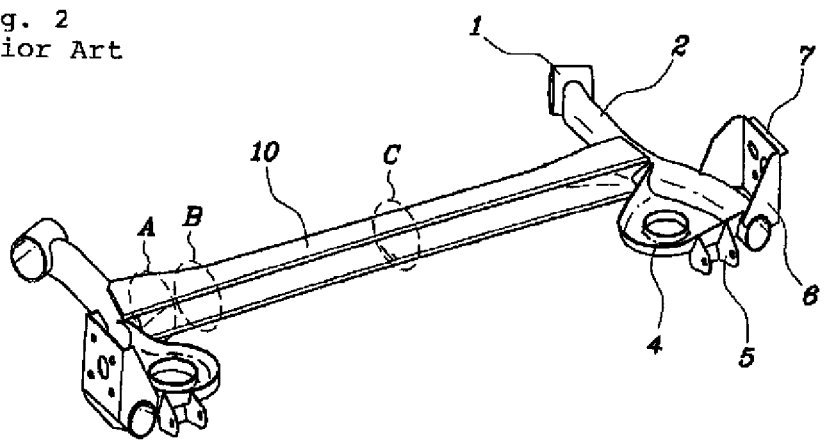
Figure 2:
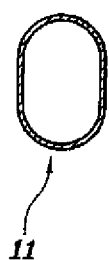
Figure 2:
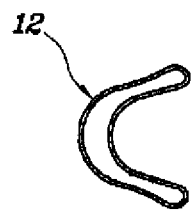
Figure 2:
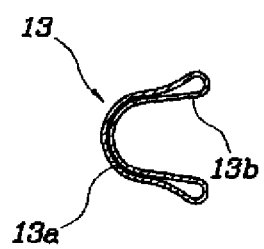
Figure 3A:
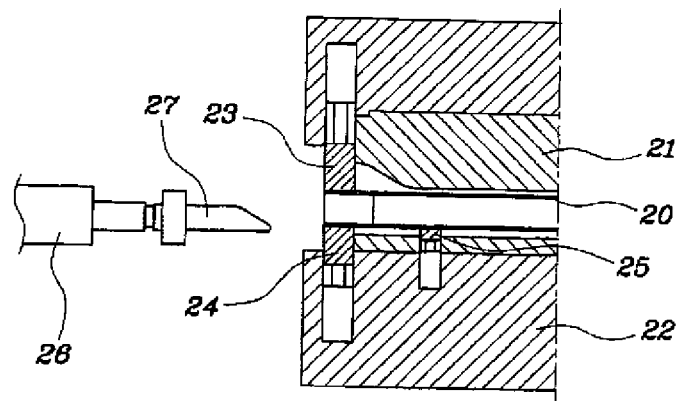
Figure 3B:
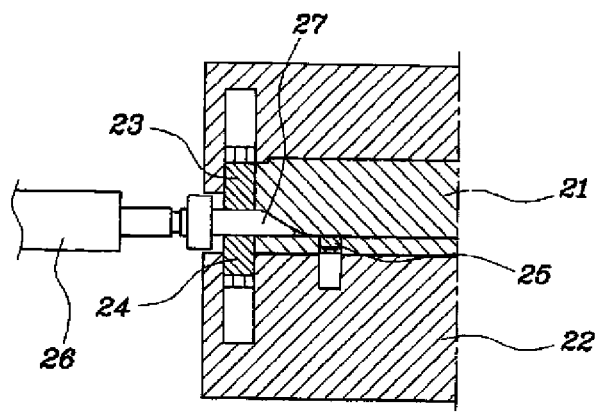
Figure 4A:
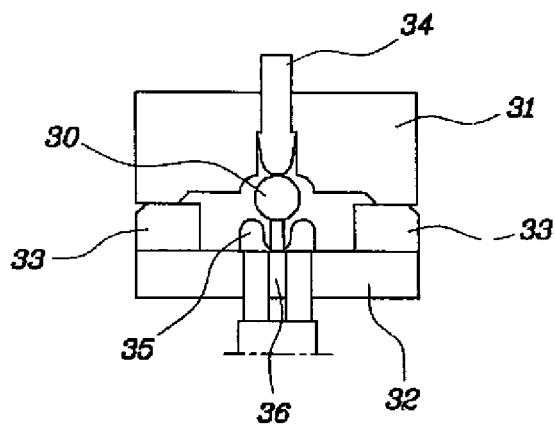
Figure 4B:
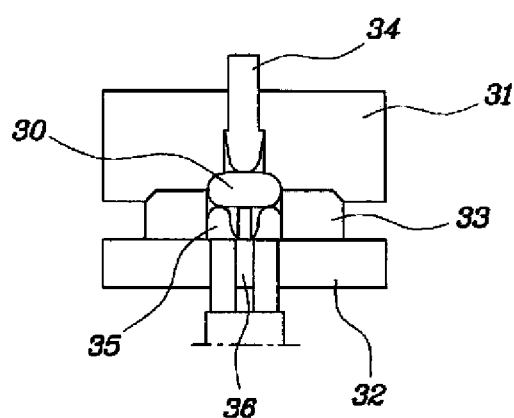
Figure 4C:
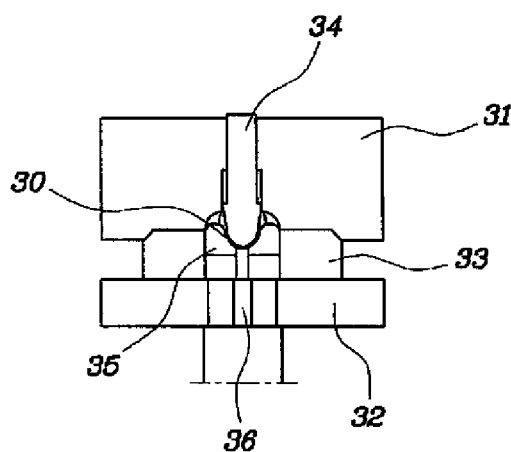

FIG. 12 illustrates a method of increasing the thickness of only the opposite ends of a preformed tubular torsion beam using the axial punches 60 having the above-mentioned construction. First, a preformed tubular steel member 10a is seated in the hydroforming machine and the upper mold is lowered. Second, each axial punch 60 is moved forwards so as to bring the close contact surface 64 of the punching tip 63 into close contact with an associated end of the preformed tubular steel member 10a. Third, actuation oil is fed into the preformed tubular steel member 10a through the inlet hole 65, which is formed through the central axis of the punching tip 63, thus pressurizing the inner surface of the tubular steel member 10a. When the pressure that is applied to the inner surface of the tubular steel member 10a by the actuation oil exceeds a predetermined reference level, the tubular steel member 10a comes into close contact with the inner surfaces of the upper and lower molds while being plastically deformed, thus being shaped into a desired tubular torsion beam [FIG. 12(a)].

Figure 12A:
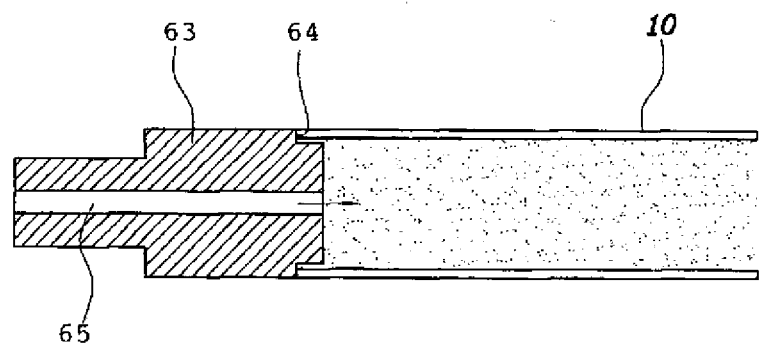
Figure 12B:
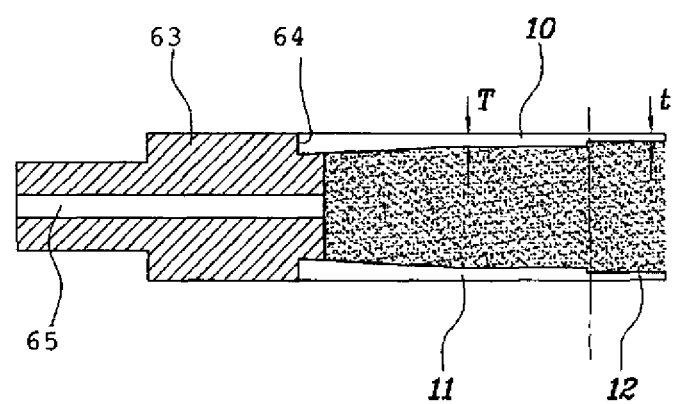

During the above-mentioned process, when the cylinder rods 62 of respective axial punches 60 are moved forwards and feed the punching tips 63 forwards, only the opposite ends 11 of the preformed tubular steel member 10a are plastically deformed, resulting in an increase in the thickness of the opposite ends of the tubular steel member. In the above state, if the force and time to be consumed to feed the punching tips 63 of the axial punches 60 are controlled, it is possible to control the length and thickness of portions subjected to thickness increase, in the tubular torsion beam [FIG. 12(b)]. The process of increasing the thickness of the opposite ends of the tubular steel member by feeding the axial punches may be executed simultaneously with the process of forming the tubular torsion beam using the pressure of actuation oil, as shown in FIG. 12(a), or may be separately executed as a post process.

In the above state, it is preferred that the feeding distance of each axial punch 60 be set to 2~150 mm and that the thickness of each end of the tubular steel member be increased to be 1.2~1.5 times the thickness of the middle portion. The increase in the thickness of the opposite ends is in proportion to the feeding distance using the axial punches 60. When the feeding distance is less than 2 mm, the increase in the thickness of the opposite ends is not significant. On the contrary, when the feeding distance exceeds 150 mm, folds may be formed in the surfaces of the opposite ends due to excessively high plastic deformation, as described above.

In the method according to the first embodiment of the present invention, to form a bead 14 on the surface of each transitional portion 11 of the tubular torsion beam 10, an optimized bead shaping surface may be formed on the lower surface of the upper mold 53 of the hydroforming machine.

In the above state, it is preferred that the bead be configured such that it has a ridge shape not exceeding a height of 35 mm, a width of 125 mm or a length of 550 mm, and such that it has a radius of curvature equal to or greater than 2.2 times the thickness of the tubular steel member. When the height of the bead 14 exceeds 35 mm, the width thereof exceeds 125 mm or the length thereof exceeds 550 mm, stress is concentrated on the bead 14, thus reducing the durability of the tubular torsion beam. Further, when the radius of curvature of the bead 14 is less than a value equal to 2.2 times the thickness of the tubular steel member, the ridge of the bead 14 becomes too sharp, so that it is almost impossible to form a precise bead shape through hydroforming, as described above.

The manufacturing method according to the second embodiment of the present invention comprises the steps of: preforming a tubular steel member having a circular cross-section prior to seating the tubular steel member in a mold of a hydroforming machine; preparing for hydroforming by seating the preformed tubular steel member in a lower mold of the hydroforming machine and by lowering an upper mold so as to close the molds; and hydroforming a tubular torsion beam by sealing opposite ends of the preformed tubular steel member, seated in the cavity between the upper and lower molds, using axial punches placed at opposite ends of the molds, by feeding actuation oil into the preformed tubular steel member seated in the molds so as to pressurize the inner surface of the tubular steel member, thus forming the tubular torsion beam having opposite ends having a closed cross-section and mounted to trailing arms, a middle portion having a V-shaped open cross-section, and a transitional portion having a varying cross-section and connecting the middle portion to each of the opposite ends, and, at the same time, forming an inclined offset at a location between the middle portion and each of the transitional portions, so that both the transitional portions and the opposite ends are enlarged outwards compared to the middle portion.

The general shapes of both the preforming machine 40 and the hydroforming machine 50, used in the second embodiment of the present invention, remain the same as those described above with reference to FIG. 9 and FIG. 10. However, an offset shaping portion for forming the inclined offset 15 is formed on the surface of each of the lower and upper molds 52 and 53, as shown in FIG. 8.

In the above state, it is preferred that the increase in the circumference of the tubular torsion beam due to the offset 15 be within 35% of the initial circumference of the tubular steel member, and that the height difference between the middle portion 13 and each transitional portion 12 due to the offset 15 not exceed 50 mm. The height difference between the middle portion 13 and each transitional portion 12 due to the offset 15 is in proportion to the increase in the circumference of the tubular torsion beam due to the offset 15. When the increase in the circumference of the tubular torsion beam due to the offset 15 exceeds 35% of the initial circumference of the tubular steel member, or the height difference between the middle portion 13 and each transitional portion 12 due to the offset 15 exceeds 50 mm, breakage may occur in the portion having the offset 15, as described above.

Although the embodiments of the present invention have been disclosed for illustrative purposes, those skilled in the art will appreciate that various modifications, additions and substitutions are possible, without departing from the scope and spirit of the invention as disclosed in the accompanying claims. Therefore, it is obvious that, although the thickness or the shape of a material of a tubular torsion beam produced through hydroforming may be variously changed according to the class or aerodynamic volume displacement of a vehicle using the tubular torsion beam, as long as the tubular torsion beam adopts the construction disclosed in the accompanying claims, the tubular torsion beam is included in the scope of the protection of the invention.

The invention claimed is:

1. A tubular torsion beam for rear suspensions of vehicles, which is produced by pressure-forming a tubular steel member through hydroforming such that the tubular torsion beam has a cross-section varying along an entire length thereof, with opposite ends having a closed cross-section and mounted to respective trailing arms, a middle portion having a V-shaped open cross-section, and a transitional portion having a varying cross-section and connecting the middle portion to each of the opposite ends, wherein a bead is formed on a surface of the transitional portion at which a maximum stress acts on the tubular torsion beam, and wherein each end of the tubular steel member is fed using an axial punch of a hydroforming machine, so that the opposite ends of the tubular torsion beam have a larger thickness than a thickness of the middle portion.

2. The tubular torsion beam for rear suspensions of vehicles according to claim 1, wherein a feeding distance of the axial punch is set to 2~150 mm.

3. The tubular torsion beam for rear suspensions of vehicles according to claim 1, wherein the thickness of the opposite ends of the tubular torsion beam is increased to be 1.2~1.5 times the thickness of the middle portion.

4. The tubular torsion beam for rear suspensions of vehicles according to claim 1, wherein the bead is configured to have a ridge shape not exceeding a height of 35 mm, a width of 125 mm and a length of 550 mm.

5. The tubular torsion beam for rear suspensions of vehicles according to claim 1, wherein the bead is configured to have a radius of curvature equal to or greater than 2.2 times the thickness of the tubular steel member.

6. A tubular torsion beam for rear suspensions of vehicles, which is produced by pressure-forming a tubular steel member through hydroforming such that the tubular torsion beam has a cross-section varying along an entire length thereof, with opposite ends having a closed cross-section and mounted to respective trailing arms, a middle portion having a V-shaped open cross-section, and a transitional portion having a varying cross-section and connecting the middle portion to each of the opposite ends, wherein an inclined offset is formed between the middle portion and the transitional portion, so that both the transitional portions and the opposite ends are enlarged outwards compared to the middle portion, wherein the inclined offset extends circumferentially around the tubular steel member.

7. The tubular torsion beam for rear suspensions of vehicles according to claim 6, wherein an increase in a circumference of the tubular torsion beam due to the offset is within 35% of an initial circumference of the tubular steel member, and a height difference between the middle portion and the transitional portion due to the offset is within 50 mM.

8. A method of manufacturing a tubular torsion beam for rear suspensions of vehicles, comprising:

preforming a tubular steel member having a circular cross-section prior to seating the tubular steel member in a mold of a hydroforming machine;

preparing for hydroforming by seating the preformed tubular steel member in a lower mold of the hydroforming machine and by lowering an upper mold so as to close the molds; and hydroforming a tubular torsion beam by sealing an interior of the preformed tubular steel member, seated in a cavity between the upper and lower molds, using axial punches placed at opposite ends of the molds, and by feeding actuation oil into the preformed tubular steel member so as to pressurize an inner surface of the tubular steel member, thus forming the tubular torsion beam having opposite ends having a closed cross-section and mounted to trailing arms, a middle portion having a V-shaped open cross-section, and a transitional portion having a varying cross-section and connecting the middle portion to each of the opposite ends with a bead being formed on a surface of the transitional portion at which a maximum stress acts on the tubular torsion beam, and, at the same time, feeding opposite ends of the tubular steel member using the axial punches so as to increase thickness of the opposite ends of the tubular torsion beam relative to the middle portion.

9. The method of manufacturing the tubular torsion beam for rear suspensions of vehicles according to claim 8, wherein, during the hydroforming, a feeding distance of each of the axial punches is set to 2~150 mm.

10. The method of manufacturing the tubular torsion beam for rear suspensions of vehicles according to claim 8, wherein, during the hydroforming, the thickness of the opposite ends of the tubular torsion beam is increased to become 1.2~1.5 times a thickness of the middle portion.

11. The method of manufacturing the tubular torsion beam for rear suspensions of vehicles according to claim 8, wherein, during the hydroforming, the bead is formed to have a ridge shape not exceeding a height of 35 mm, a width of 125 mm and a length of 550 mm.

12. The method of manufacturing the tubular torsion beam for rear suspensions of vehicles according to claim 8, wherein, during the hydroforming, the bead is formed to have a radius of curvature equal to or greater than 2.2 times a thickness of the tubular steel member.

13. A method of manufacturing a tubular torsion beam for rear suspensions of vehicles, comprising:
preforming a tubular steel member having a circular cross-section prior to seating the tubular steel member in a mold of a hydroforming machine;
preparing for hydroforming by seating the preformed tubular steel member in a lower mold of the hydroforming machine and by lowering an upper mold so as to close the molds; and
hydroforming a tubular torsion beam by sealing an interior of the preformed tubular steel member, seated in a cavity between the upper and lower molds, using axial punches placed at opposite ends of the molds, by feeding actuation oil into the preformed tubular steel member so as to pressurize an inner surface of the tubular steel member, thus forming the tubular torsion beam having opposite ends having a closed cross-section and mounted to trailing arms, a middle portion having a V-shaped open cross-section, and a transitional portion having a varying cross-section, and connecting the middle portion to each of the opposite ends, and, at the same time, forming an inclined offset at a location between the middle portion and the transitional portion, so that both the transitional portions and the opposite ends are enlarged outwards compared to the middle portion, the inclined offset extending circumferentially around the tubular steel member.

14. The method of manufacturing the tubular torsion beam for rear suspensions of vehicles according to claim 13, wherein, during the hydroforming, an increase in a circumference of the tubular torsion beam due to the offset is within 35% of an initial circumference of the tubular steel member, and a height difference between the middle portion and the transitional portion due to the offset is within 50 mm.

15. The tubular torsion beam for rear suspensions of vehicles according to claim 2, wherein the thickness of the opposite ends of the tubular torsion beam is increased to be 1.2~1.5 times the thickness of the middle portion.

16. The tubular torsion beam for rear suspensions of vehicles according to claim 4, wherein the bead is configured to have a radius of curvature equal to or greater than 2.2 times the thickness of the tubular steel member.

17. The method of manufacturing the tubular torsion beam for rear suspensions of vehicles according to claim 9, wherein, during the hydroforming, the thickness of the opposite ends of the tubular torsion beam is increased to become 1.2~1.5 times a thickness of the middle portion.

18. The method of manufacturing the tubular torsion beam for rear suspensions of vehicles according to claim 11, wherein, during the hydroforming, the bead is formed to have a radius of curvature equal to or greater than 2.2 times a thickness of the tubular steel member.

* * * * *

UNITED STATES PATENT AND TRADEMARK OFFICE
CERTIFICATE OF CORRECTION

PATENT NO. : 8,308,175 B2  Page 1 of 9
APPLICATION NO. : 12/669863
DATED : November 13, 2012
INVENTOR(S) : Han Ho Choi et al.

It is certified that error appears in the above-identified patent and that said Letters Patent is hereby corrected as shown below:

Please substitute the printed Drawing Sheets 1-8 with the attached replacement Drawing Sheets 1-8.

Column 14, Line 49, Claim 7, delete "mM." and insert -- mm. --.

Signed and Sealed this
Twenty-sixth Day of February, 2013

Teresa Stanek Rea
*Acting Director of the United States Patent and Trademark Office*

(A)

(B)

(C)